(12) United States Patent
Paweletz et al.

(10) Patent No.: US 9,614,424 B2
(45) Date of Patent: Apr. 4, 2017

(54) LINEAR DRIVE AND PISTON PUMP ARRANGEMENT

(71) Applicant: Robert Bosch GmbH, Stuttgart (DE)

(72) Inventors: Anton Paweletz, Fellbach (DE); Michael Knoop, Ludwigsburg (DE); Dietmar Kratzer, Tamm (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 14/098,301

(22) Filed: Dec. 5, 2013

(65) Prior Publication Data
US 2014/0161650 A1  Jun. 12, 2014

(30) Foreign Application Priority Data

Dec. 6, 2012 (DE) .......................... 10 2012 222 430
Mar. 28, 2013 (DE) .......................... 10 2013 205 708
Sep. 10, 2013 (DE) .......................... 10 2013 218 064

(51) Int. Cl.
*H02K 33/12* (2006.01)
*F04B 17/03* (2006.01)
*F04B 17/04* (2006.01)
*H02K 41/03* (2006.01)

(52) U.S. Cl.
CPC ............. *H02K 33/12* (2013.01); *F04B 17/03* (2013.01); *F04B 17/042* (2013.01); *H02K 41/03* (2013.01)

(58) Field of Classification Search
CPC ........ H02K 33/12; H02K 33/14; H02K 41/03; F04B 17/03; F04B 17/04

USPC .......................... 310/15, 12, 12.13, 12.15, 14; 417/415–417; 335/266–268; 251/129.1
See application file for complete search history.

(56) References Cited

U.S. PATENT DOCUMENTS

| | | | | |
|---|---|---|---|---|
| 2,628,319 A | * | 2/1953 | Vang | H02K 33/12 310/15 |
| 3,162,796 A | * | 12/1964 | Schreiber | B23Q 17/22 310/12.15 |
| 3,430,120 A | * | 2/1969 | Takemi | G05B 19/40 310/14 |
| 3,433,983 A | * | 3/1969 | Keistman | F04B 17/042 310/12.04 |
| 3,881,139 A | * | 4/1975 | Inaba | H02K 41/03 310/12.15 |
| 3,891,874 A | * | 6/1975 | Roters | H02K 33/16 310/14 |

(Continued)

FOREIGN PATENT DOCUMENTS

| DE | 30 33 684 A1 | 4/1982 | | |
|---|---|---|---|---|
| DE | 10258279 | * | 7/2004 | H01F 7/124 |

*Primary Examiner* — Burton Mullins
(74) *Attorney, Agent, or Firm* — Maginot, Moore & Beck LLP

(57) ABSTRACT

A linear drive, in particular for a piston pump, includes a first electromagnetic drive device, a second electromagnetic drive device, and a drive piston configured to be moved in an axial direction by the drive devices. The first drive device and the second drive device are each in the form of a reluctance drive device. The reluctance drive devices each have a stator with a stator coil that engages around the drive piston in a circumferential direction. The reluctance drive devices each also have a coil core with a coil receptacle, open in a radial direction toward the drive piston, for the coil winding. A piston pump arrangement includes the linear drive.

11 Claims, 10 Drawing Sheets

(56) References Cited

U.S. PATENT DOCUMENTS

| | | | | |
|---|---|---|---|---|
| 3,895,281 A * | 7/1975 | Corbaz | ............... | H01F 7/064 |
| | | | | 318/135 |
| 3,931,554 A * | 1/1976 | Spentzas | ............ | H02K 33/12 |
| | | | | 310/30 |
| 4,543,502 A * | 9/1985 | Jarret | ................ | H02K 1/34 |
| | | | | 310/15 |
| 4,726,453 A * | 2/1988 | Obstfelder | ....... | B60G 17/0152 |
| | | | | 137/625.35 |
| 4,798,054 A * | 1/1989 | Higham | ............ | F25B 9/14 |
| | | | | 60/520 |
| 5,691,582 A * | 11/1997 | Lucas | ............. | H02K 41/031 |
| | | | | 310/14 |
| 6,700,230 B1 * | 3/2004 | Gokturk | ........... | H02K 33/16 |
| | | | | 310/12.15 |
| 6,853,099 B2 * | 2/2005 | Uchida | ........... | G03F 7/70758 |
| | | | | 310/12.17 |

* cited by examiner

LINEAR DRIVE AND PISTON PUMP ARRANGEMENT

This application claims priority under 35 U.S.C. §119 to patent application nos. DE 10 2012 222 430.0 filed on Dec. 6, 2012 in Germany, DE 10 2013 205 708.3 filed on Mar. 28, 2013 in Germany, and DE 10 2013 218 064.0 filed on Sep. 10, 2013 in Germany, the disclosures of all of which are incorporated herein by reference in their entirety.

BACKGROUND

The disclosure relates to a linear drive, in particular for a piston pump, having a first electromagnetic drive device, having a second electromagnetic drive device and having a drive piston which can be moved in an axial direction by means of the drive devices. The disclosure also relates to a piston pump arrangement.

The linear drive has the two electromagnetic drive devices and the drive piston, which can be moved in an axial direction by means of the drive devices. Here, a movement of the drive piston in a first direction can be effected by means of the first electromagnetic drive device, and a movement of the drive piston in a second direction opposite to the first direction can be effected by means of the second electromagnetic drive device, by virtue of the respective drive device generating a magnetic field. The linear drive can particularly advantageously be used as a drive for a piston pump.

Known from the prior art is, for example, DE 30 33 684 A1 which describes a piston pump with electromagnetic drive. Here, the piston of the piston pump is in the form of a drilled-through cylinder composed of ferromagnetic material of high remanence and high coercive force, and is permanently axially magnetized. The piston, in a cylinder liner which is composed of non-magnetic material, moves back and forth between the poles of two coaxially configured electromagnets under the influence of an excitation current. The magnetic circuit is closed in each case by means of a common force-guiding piece directed radially toward the center of the piston, wherein preferably, a valve situated in the axial longitudinal bore of the piston serves to ensure a unidirectional flow.

The use of an electromagnetic linear drive of said type is however often possible only with great outlay and with high material costs, in particular owing to a commonly required high-energy permanent magnet ring, because firstly the force and/or the maximum attainable stroke frequency of the linear drive are not sufficient, and secondly the linear drive exhibits greater power consumption than a rotating electric motor which actuates the pump piston eccentrically. This is a problem in particular when the linear drive is used for a piston pump in a vehicle control system, in particular in a driver assistance system. In the latter, use is thus commonly made of piston pumps which have the above-described rotating electric motor which actuates the pump piston eccentrically by means of an eccentric. This means, however, that the volume flow of the fluid delivered by means of the piston pump can be adjusted only by means of the rotational speed of the electric motor, that is to say by means of the frequency of the eccentric actuation.

SUMMARY

The linear drive having the features of the disclosure has, by contrast, the advantage that both the frequency and also the stroke of the displacement of the drive piston are selectable. Furthermore, said linear drive has a lower energy requirement than known linear drives and nevertheless provides an adequately large force for the actuation of the piston pump. This is achieved according to the disclosure by virtue of the first drive device and the second drive device each being in the form of a reluctance drive device, wherein each of the reluctance drive devices has a stator with a coil winding, the latter engaging around the drive piston in a circumferential direction, and has a coil core which has a coil receptacle, open in a radial direction toward the drive piston, for the coil winding. As already explained above, the two drive devices are designed for displacing the drive pistons in preferably opposite directions. Correspondingly, the first drive device can generate a force in the first direction and the second drive device can generate a force in the second direction, said forces acting in each case on the drive piston. The drive devices are now formed as reluctance drive devices.

A reluctance drive device is substantially to be understood in particular to mean a drive device in which only the stator, but not the rotor or the drive piston, is supplied with current, and in which preferably no permanent magnet is required. Correspondingly, the stator has the coil winding or at least one coil winding. The coil winding is assigned to the coil core or accommodates said coil core within it at least in regions, such that when the coil winding is supplied with current, a magnetic flux is generated in the coil core. The coil winding is now arranged so as to engage around, in particular so as to engage fully around, the drive piston in a circumferential direction—with respect to a longitudinal central axis of the drive piston. Furthermore, the coil core is intended to have the coil receptacle in which the coil winding is arranged. Said coil receptacle is open in a radial direction toward the drive piston. The opening of the coil receptacle is thus arranged on that side of the coil core which faces toward the drive piston.

Now, when the coil winding is supplied with current, that is to say when a magnetic field and thus a magnetic flux are present in the coil core, said coil core seeks to force the drive piston, or an armature element, assigned to the coil winding, of the drive piston, into a position with minimum reluctance. Said position is present for example when—as viewed in cross section—the armature element—as viewed in an axial direction—is arranged so as to be centered with respect to the coil core, that is to say in particular the (geometric) center of the armature element coincides with the (geometric) center of the coil core, in particular in the axial direction. Corresponding to the principle of the reluctance drive device, the armature element is composed for example of a ferromagnetic material, and is preferably not permanently magnetized. Said armature element is preferably composed of a soft magnetic material, that is to say of a ferromagnetic material, which can be easily magnetized in a magnetic field. The soft magnetic material has for example a coercive field strength of at most 1000 A/m. The ferromagnetic or soft magnetic material is for example in the form of iron or an iron alloy.

Numerous advantages are obtained in particular if the linear drive is used for driving the piston pump. Firstly, a pump piston of the piston pump may be fixedly connected to the drive piston, for example in a non-positively locking, positively locking and/or cohesive manner. Furthermore, the volume flow of the piston pump can now be scaled not only by means of the frequency of the displacement of the drive piston but additionally by means of the stroke thereof. This yields a reduction in the volume flow non-uniformity and consequently of the noises thereby induced. Because the actuation is now possible with two degrees of freedom, specifically the frequency and the amplitude of the drive piston, expedient operating ranges (for example with regard to comfort variance and/or power variance) can be achieved more effectively through corresponding actuation of the linear drive.

The eccentric by means of which a rotation of the electric motor is converted into an oscillating movement of the pump piston may also be omitted. This results inter alia in a further noise reduction through elimination of mechanical noise sources, for example bearing, eccentric and/or commutator. Specifically as a result of the omission of the commutator, which normally comprises carbon brushes, a considerable lengthening of service life is also achieved. A further advantage is the fact that, depending on the material used, a reduction of installation space requirement and weight, and consequently an increased power density, can be achieved. Also, the number of components required, for example bearings, brushes and/or brush carriers, is considerably reduced. Furthermore, manufacturing is simplified. This applies in particular to the stator coil and to the armature element. Cumbersome contacting of an armature element, such as is required for a commutator machine, is eliminated. Improved diagnostics during manufacturing are thus also possible.

As a result of the drive devices being in the form of reluctance drive devices, permanent magnets, which commonly contain rare earths and are consequently expensive, are omitted. With corresponding configuration of the linear drive, it is also possible to dispense with a mechanical stop, or the latter can be replaced with an electromagnetic stop. This correspondingly yields a simplification of the regulation and operational diagnostics of the piston pump and of the linear drive. Also, the coil windings of the linear drive according to the disclosure can be manufactured with a very good fill factor. This permits inter alia good thermal coupling of the coils to the respective coil core, such that effective cooling of, or heat extraction from, the coil winding is possible.

The piston pump that is driven by means of the linear drive is also extremely robust. For example, a leakage of fluid does not lead to a malfunction of the piston pump. Furthermore, there are no radial bearings and/or carbon brushes, which are usually subject to high levels of wear and which correspondingly limit the service life of the piston pump.

It is self-evidently also possible for more than one piston pump, in particular two piston pumps, to be driven by means of the linear drive. The linear drive is preferably designed such that its working points are stable, such that the movement of the drive piston does not need to be limited with the aid of mechanical stops. The linear drive can be adjusted firstly with regard to the frequency of the stroke and also by means of the size of the stroke. The former is performed through corresponding selection of the frequency with which the current supplied to the drive devices alternates. The latter may be adjusted as desired through a variation of the duration of the supply of current.

In an advantageous embodiment of the disclosure, it is provided that the coil receptacle is delimited in the axial direction by two free ends, which point in the radial direction toward the drive piston, of the coil core. Here, too, the axial direction is to be understood in relation to the longitudinal central axis of the drive piston. The two free ends of the coil core are thus in particular visible in a longitudinal section through the linear drive. Owing to the two free ends, the coil core is of substantially U-shaped configuration, wherein the two legs of the U-shape in the form of the free ends point in the direction of the coil core, or run in a radial direction toward said coil core. The two free ends preferably point exactly in the radial direction toward the drive piston, such that imaginary elongations of the free ends or of the legs are perpendicular to the longitudinal central axis of the drive piston.

It may be provided that the coil receptacle is in the form of an annular gap or is composed of multiple segments, in particular annular gap segments. As viewed in cross section—with respect to the longitudinal central axis of the drive piston—the coil receptacle is round or circular. Here, said coil receptacle may be of continuous form, that is to say be provided, or formed in the coil core, over the entire circumference—again with respect to the longitudinal central axis—of the drive piston. Alternatively, said coil receptacle may self-evidently be composed of the multiple segments, which are for example in the form of annular gap segments. The segments may for example be arranged with tangential point symmetry.

This means that the coil receptacle is not provided in the coil core over the entire circumference, but that, for example, the coil core is composed of multiple parts which are arranged in a distributed manner, in particular uniformly distributed manner, in the circumferential direction. It is self-evidently preferably provided that the armature element of the drive piston is formed analogously, or so as to be matched in terms of shape, to the coil receptacle. The armature element may thus also be of continuous form in the circumferential direction and consequently provided as a ring, or may be composed of multiple segments which are in particular fastened to the drive piston. In this way, the drive devices can be configured such that the main magnetic flux is in each case subjected to the least magnetic resistance. If the multiple segments are provided, these are provided so as to be offset with respect to one another for example by 180°, 120°, 90°, 60°, 45°, 30° or 20° in the circumferential direction, and are furthermore spaced apart from one another, in particular uniformly spaced apart from one another, in the circumferential direction. In the case of the assembled coil receptacle, it is also preferably provided that the coil winding is of continuous form in the circumferential direction.

A further embodiment of the disclosure provides that each coil core is assigned an armature element arranged on the drive piston. Said armature element has already been discussed above. In particular, the armature element is composed of the ferromagnetic material and is not permanently magnetized. The armature elements are arranged on or fastened to the drive piston such that a force imparted to the respective armature element by means of the coil core is transmitted to the drive piston. It is preferable for each coil core to be assigned precisely one armature element, which—as already stated above—however need not be of continuous form in the circumferential direction, though this is preferable.

One refinement of the disclosure provides that the coil core has the same axial extent as the armature element assigned thereto. The coil core may be of U-shaped form and consequently have the two free ends which point in the radial direction toward the drive piston. In this case, said two free ends delimit the coil core in the axial direction. Correspondingly, the armature element assigned to the respective coil core has an extent such that it projects from a first of the free ends to a second of the free ends, or as viewed in an axial direction, terminates flush with the two averted sides of the free ends. In another embodiment of the coil core, the entire axial extent thereof should be considered. In that case, the armature element should have the same axial extent.

A preferred refinement of the disclosure provides that the armature element has two armature arms which, in the radial direction, face the free ends of the coil core. Consequently, the armature element is also of U-shaped configuration as seen in longitudinal section, wherein the legs of said U-shape have, in the radial direction, an orientation opposite to that of the free ends of the coil core. The free ends of the coil core are preferably configured so as to be congruent with the armature arms of the armature element, that is to say have the same dimensions in the axial direction, radial direction and/or circumferential direction. In at least one position of the drive piston, the free ends of the coil core form elongations of the two armature arms of the armature element.

In a preferred embodiment of the disclosure, it is provided that the two armature arms have, in the axial direction, the same dimensions as the free ends of the coil core. This embodiment has already been indicated above. This has the advantage that it is easy to determine the drive piston position that exhibits the minimum reluctance for the respective drive device, and said drive piston position corresponds to the position in which the two armature arms are in congruence with the free ends of the coil core.

A further embodiment of the disclosure provides that the armature elements have, in the axial direction, a greater spacing from one another than the coil cores. Correspondingly, the drive piston position in which the first drive device exhibits its minimum reluctance is spaced apart from the drive piston position in which the second drive device exhibits its minimum reluctance. By means of an alternating supply of current to the first drive device and to the second drive device, it is consequently possible to realize a movement of the drive piston in opposite directions.

It may advantageously be provided that the armature elements are arranged relative to one another such that, when one of the armature elements is in a position of congruence with respect to the corresponding coil core, the respective other armature element is displaced out of its position of congruence. The position of congruence is to be understood to mean that position of the armature element in which the arrangement of coil core and armature element exhibits the least reluctance. In other words, the length of overlap in the region of the smallest point of the air gap should be at a maximum. If one of the reluctance drive devices is supplied with current, the respective armature element is forced in the direction of the position of congruence. Correspondingly, a force is generated which forces the armature element of the respective other reluctance drive device out of its position of congruence. It is consequently possible to achieve a cyclic movement of the drive piston by means of an alternating supply of current to the reluctance drive devices.

The coil windings are advantageously composed of profile wire wound with a high packing density. In this way, it is possible to realize an adequately intense magnetic field and consequently an adequately large force of the linear drive.

It may finally be provided that a restoring spring element is operatively connected to the drive piston. The restoring spring element serves to generate a restoring movement of the drive piston in to a certain position, in particular into an initial position. The initial position may for example correspond to one of the drive piston positions in which one of the drive devices has its minimum reluctance. Alternatively, however, the initial position may also be regarded as a position in which neither drive device is arranged in a state of minimum reluctance.

The disclosure also relates to a piston pump arrangement having a piston pump, which has a pump piston, and having a linear drive for actuating the pump piston, in particular a linear drive in accordance with the statements made above, wherein the linear drive has a first electromagnetic drive device, a second electromagnetic drive device and a drive piston which can be displaced in an axial direction by means of the drive devices and which is operatively connected to the pump piston. It is provided here that the first drive device and the second drive device are each in the form of a reluctance drive device, wherein each of the reluctance drive devices has a stator with a coil winding, the latter engaging around the drive piston in a circumferential direction, and has a coil core which has a coil receptacle, open in a radial direction toward the drive piston, for the coil winding. The advantages of such an embodiment of the linear drive and of the piston pump arrangement have already been discussed. The piston pump arrangement and the linear drive may be refined in accordance with the statements made above, such that in this regard, reference is made to said statements.

BRIEF DESCRIPTION OF THE DRAWINGS

The disclosure will be explained in more detail below on the basis of the exemplary embodiments illustrated in the drawings, without the disclosure thereby being restricted. In the drawings.

DETAILED DESCRIPTION

Figure 1:
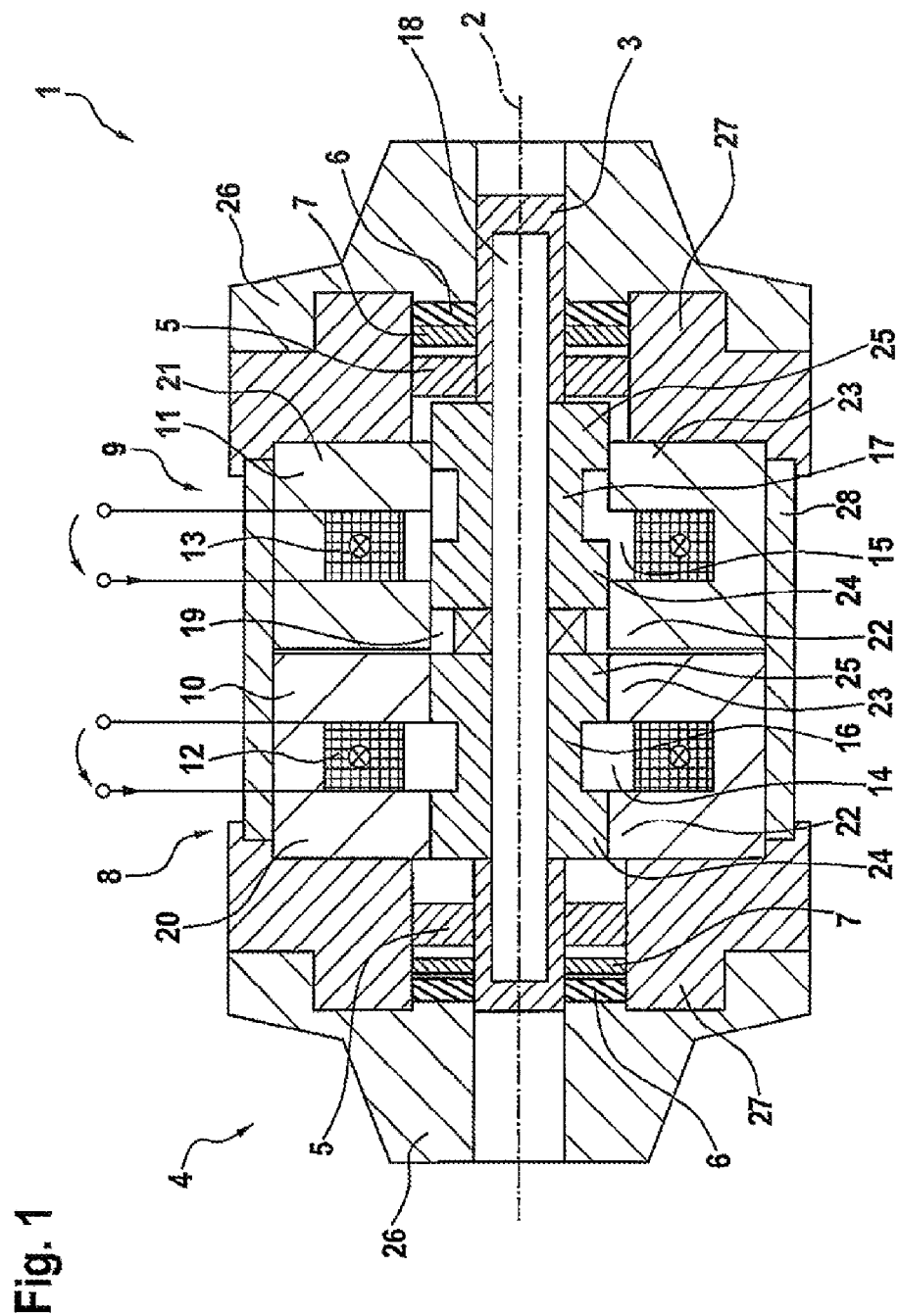
FIG. 1 is a longitudinal sectional illustration through a first embodiment of a linear drive.

FIG. 1 shows a longitudinal section through a linear drive 1 along a longitudinal central axis 2 of a drive piston 3 which is movable in an axial direction. The drive piston 3 is mounted on a housing 4 of the linear drive 1. Radial bearings 5 in the form of guide rings, for example, are provided for this purpose. It is additionally possible for sealing rings 6 to be provided which interact both with the housing 4 and also with the drive piston 3 so as to provide a fluid-sealing action. It is additionally possible for a support ring 7 to be provided in each case between the sealing ring 6 and the radial bearing 5, which support ring serves for preventing gap extrusion. Furthermore, the linear drive 1 has a first electromagnetic drive device 8 and a second electromagnetic drive device 9. These are in each case in the form of reluctance drive devices and have in each case a stator 10 or 11 respectively with a coil winding 12 or 13 respectively.

The coil winding 12 or 13 respectively is arranged in a coil receptacle 14 or 15 respectively of the stator 10 or 11 respectively. Each stator 10 and 11 is assigned an armature element 16 or 17 respectively. The armature elements 16 and 17 are composed of a ferromagnetic material. Said armature elements are operatively connected to the drive piston 3. In the exemplary embodiment illustrated here, this is realized by means of an armature carrier 18, which is preferably composed of a non-magnetic or magnetically passive material. The armature carrier 18 is fastened directly to the drive piston 3 and extends, as viewed in an axial direction, through a central recess 19 of the stators 10 and 11. The armature carrier 18 may self-evidently also be a constituent part of the drive piston 3. Said armature carrier is for example formed materially integrally with said drive piston.

Numerous embodiments are conceivable for the armature carrier 18 and the drive piston 3. Firstly, it is possible for both the drive piston 3 and the armature carrier 18 to be composed of a magnetic material. This has the disadvantage of a relatively large mass, whereby the vibration frequency and system dynamics are reduced and additional iron losses are generated. An advantage is that the flux density in the stator 10 or 11 respectively is reduced, such that a reduction of the iron losses, and consequently of the actuator current, is achieved overall. In a further embodiment, both the drive piston 3 and also the armature carrier 18 are composed of non-magnetic material. For example, if aluminum is used, the moving mass is reduced. This makes a higher operating frequency possible and increases actuator dynamics. However, greater iron losses are in turn encountered in the stators 10 and 11, which leads to greater phase currents. As a comprise, use may be made of an embodiment in which the drive piston 3 is composed of a magnetic material and the armature carrier 18 is composed of a non-magnetic material.

The stators 10 and 11 are formed in each case by a coil core 20 or 21 respectively, said coil core having the coil receptacle 14 or 15 respectively. Here, the coil receptacles 14 and 15 are each open in the radial direction toward the drive piston 3 and toward the armature carrier 18. Here, it is provided in particular that each coil core 20 and 21 has two free ends 22 and 23 which enclose the coil receptacle 14 and 15 in the axial direction, that is to say delimit said coil receptacle in the axial direction. For this purpose, each armature element 16 and 17 has two armature arms 24 and 25 which, in the radial direction, face the free ends 22 and 23 of the coil cores 20 and 21. Here, the coil cores 20 and 21 have the same axial extent as the armature element 16 or 17 respectively assigned to the respective coil core 20 and 21.

For each of the armature elements 16 and 17, the drive piston 3 can be assigned a position in which the armature element 16 or 17 respectively assumes a position of minimum reluctance with respect to the associated coil core 20 or 21. Said position is referred to as the position of congruence of the respective armature element 16 or 17 respectively. The armature elements 16 and 17 are now arranged relative to one another such that, when one of the armature elements 16 and 17 is in a position of congruence, the respective other armature element 16 or 17 is forced out of its position of congruence. If one of the armature elements 16 and 17 is in its position of congruence and if the supply of current to the coil winding 12 or 13 respectively assigned to said armature element is stopped and, instead, the other coil winding 13 or 12 respectively is supplied with current, the respective other armature element 17 or 16 is forced into its energy-optimized state, that is to say its position of congruence. Here, the former armature element 16 or 17 respectively is forced out of its position of congruence. By means of an alternating supply of current to the two coil windings 12 and 13, it is thus possible to generate an oscillating movement of the drive piston 3. By means of an operative connection, said oscillating movement can be transmitted for example to a pump piston of a piston pump of a piston pump arrangement (not illustrated here).

In the embodiment illustrated here, the housing 4 has end pieces 26 which, by way of connecting pieces 27, hold between them a substantially cylindrical sleeve piece 28 of the housing 4. The connecting pieces 27 are for example configured so as to additionally serve for holding and/or receiving the radial bearing 5, the sealing ring 6 and/or the support ring 7.

Figure 2:
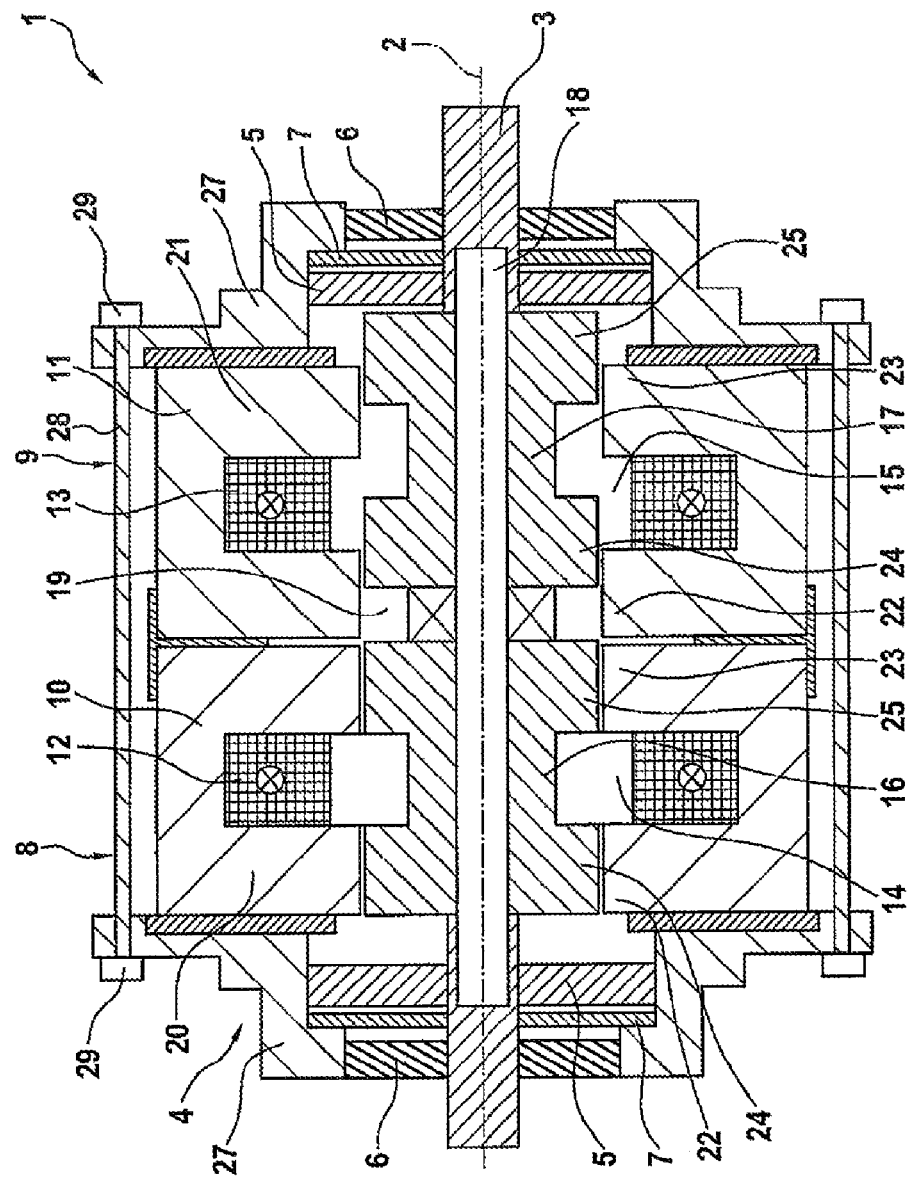
FIG. 2 is a longitudinal sectional illustration of a second embodiment of the linear drive.

FIG. 2 shows a second embodiment of the linear drive 1. Said second embodiment is basically similar to the embodiment already described, such that reference is made to the statements made above. Provision is now made here for the end pieces 26 to be dispensed with, such that the housing 4 is composed substantially of the connecting pieces 27 and of the sleeve piece 28 held between them. The sleeve piece 28 is held on the connecting pieces 27 for example by means of screw connections 29. This embodiment has the advantage that reliable centering of the stators 10 and 11, and/or a more efficient dissipation of heat, can be achieved in a simple manner.

Figure 3:
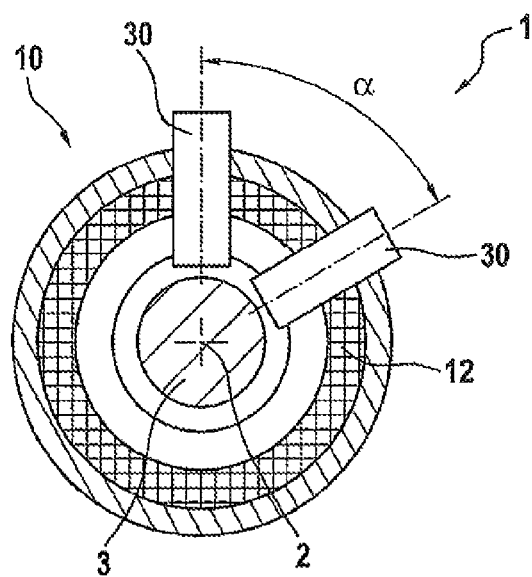
FIG. 3 shows a cross section through a stator of a reluctance drive device of the linear drive.

FIG. 3 shows a cross section through the linear drive 1 in the region of the stator 10, the latter being provided in an alternative configuration which can be readily transferred to the embodiments described above. Here, the coil receptacle 14 is not provided in the form of an annular gap, but rather is composed of multiple segments, in particular annular gap segments. These are formed by, or provided in, segments 30 of the coil core 20. The segments 30 are in this case only partially illustrated. They are arranged so as to be distributed uniformly over the circumference with respect to the longitudinal central axis 2, wherein the pitch angle α is provided between them in each case. Said pitch angle is for example 20°, 30°, 45°, 60°, 90°, 120° or 180°.

In all variants, however, the coil windings 12 or 13 respectively are of concentric construction and are in particular of annular form, that is to say engage fully around the drive piston 3 or the armature carrier 18 in the circumferential direction.

This permits efficient and fast production with a low resistance of the coil windings 12 and 13 and simultaneously good thermal characteristics. In particular, a balanced temperature within the coil windings 12 and 13 and a good thermal connection to the coil core 20 are achieved in this way. The segments 30 and/or the coil cores 20 are provided for example in the form of laminated cores. These comprise numerous individual laminations.

Figure 4:
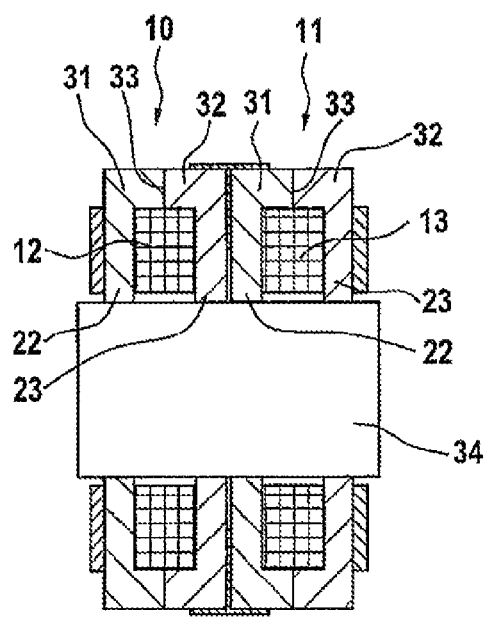
FIG. 4 is a schematic longitudinal sectional illustration of the stator of the linear drive.

FIG. 4 shows a longitudinal section through a region of the linear drive in the region of the stators 10 and 11. Here, it is clear that each stator 10 or 11 respectively is composed of multiple stator elements 31 and 32 which are connected to one another in the region of a contact point 33. To achieve a precise alignment of the stator elements 31 and 32, use is made, during assembly of the linear drive 1, for example of an assembly peg 34 onto which the stator elements 31 and 32 are pushed in corresponding sequence. Extremely precise positioning in the radial direction is achieved in this way.

Figure 5:
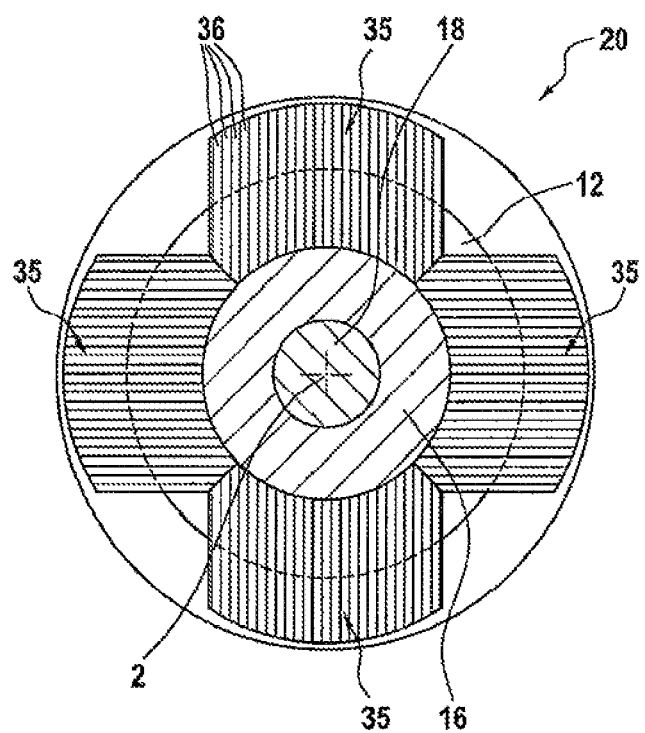
FIG. 5 shows a cross section through the linear drive.

FIG. 5 shows one possible configuration of the coil cores 20 and 21, wherein only the former will be discussed here. It is clear that the coil core 20 is composed of multiple coil core segments 35 which are arranged so as to be distributed uniformly in the circumferential direction. Furthermore, it can be clearly seen that each coil core segment 35 is composed of a multiplicity of laminations 36, only some of which are denoted here by way of example.

Figure 6:
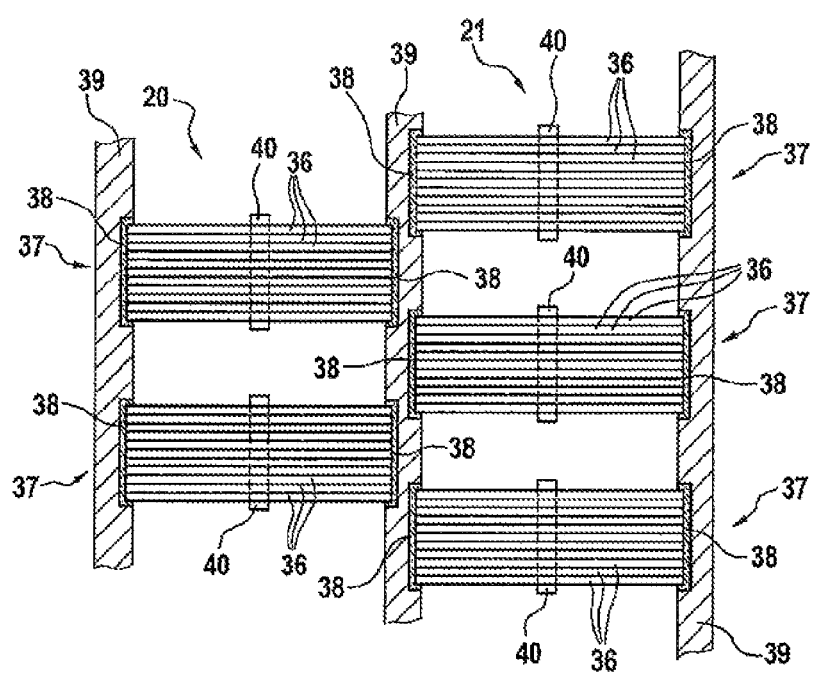
FIG. 6 shows a longitudinal section through a region of the linear drive.

FIG. 6 shows a longitudinal section through the linear drive 1, wherein the coil cores 20 and 21 are shown. It can be seen here, too, that the coil cores 20 and 21 are composed of numerous laminations 36, these being divided into multiple laminated cores 37. Each laminated core 37 is embedded, via an insulator 38, in a bracket 39. Damping elements 40 for vibration damping may additionally be provided. By means of this offset arrangement, the magnetic coupling of the stator phases is reduced. Improved operating characteristics can be attained in this way.

Figure 7:
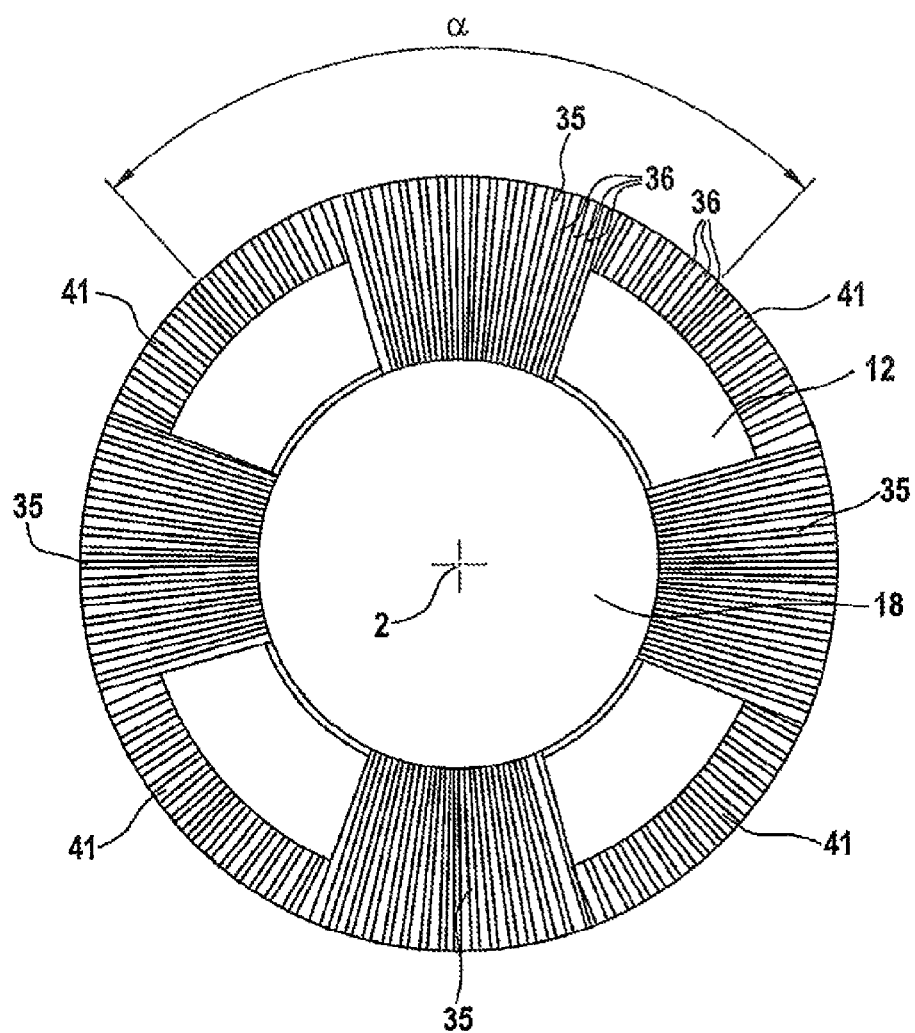
FIG. 7 shows a cross section through a region of the linear drive.

FIG. 7 shows a further embodiment of the coil cores 20 and 21, wherein each of the coil cores 20 and 21 is composed of multiple coil core segments 35 (coil core 20) and 41 (coil core 21). The coil core segments 35 and 41 respectively are arranged distributed over the circumference of the drive piston 3, or of the armature carrier 18, so as to be offset with respect to one another by the pitch angle α. It is clear here that the coil core segments 35 and 41 are composed of individual laminations 36, which are indicated merely by way of example. Said laminations are however arranged in the radial direction with respect to the longitudinal central axis 2, by contrast to the embodiment described on the basis of FIG. 5.

Figure 8:
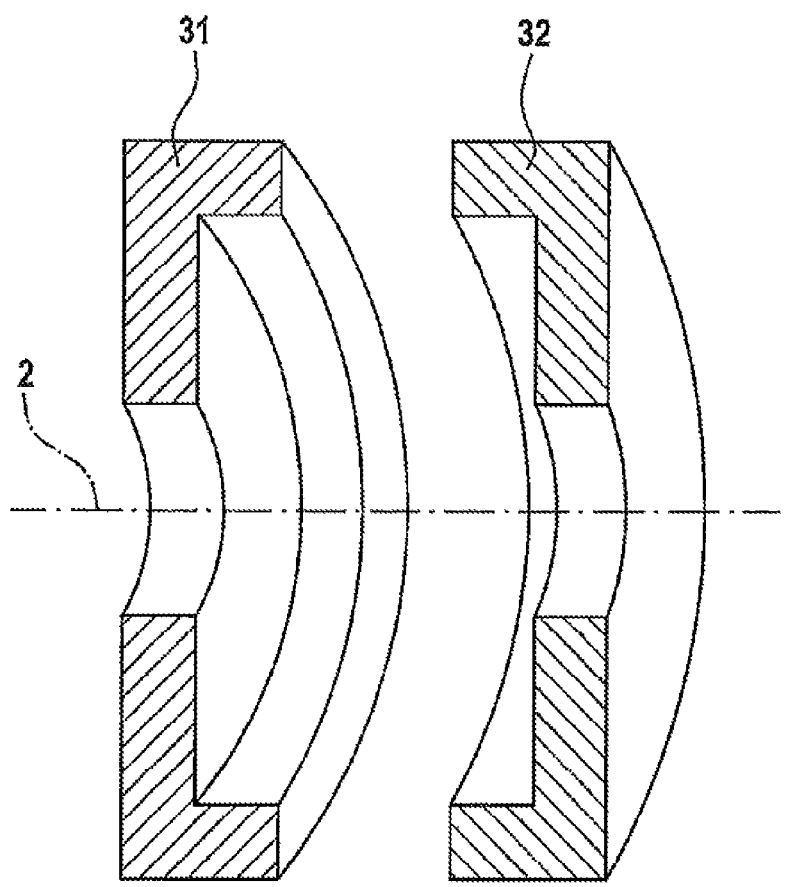
FIG. 8 is a schematic illustration of a stator element for the stator of the linear drive.

FIG. 8 shows, by way of example, the stator elements 31 and 32 which are connected to one another to produce the stator 10 or 11 respectively. The stator elements 31 and 32 may for example be composed of a fiber composite material or a powder composite material, in particular iron powder composite material.

Figure 9:
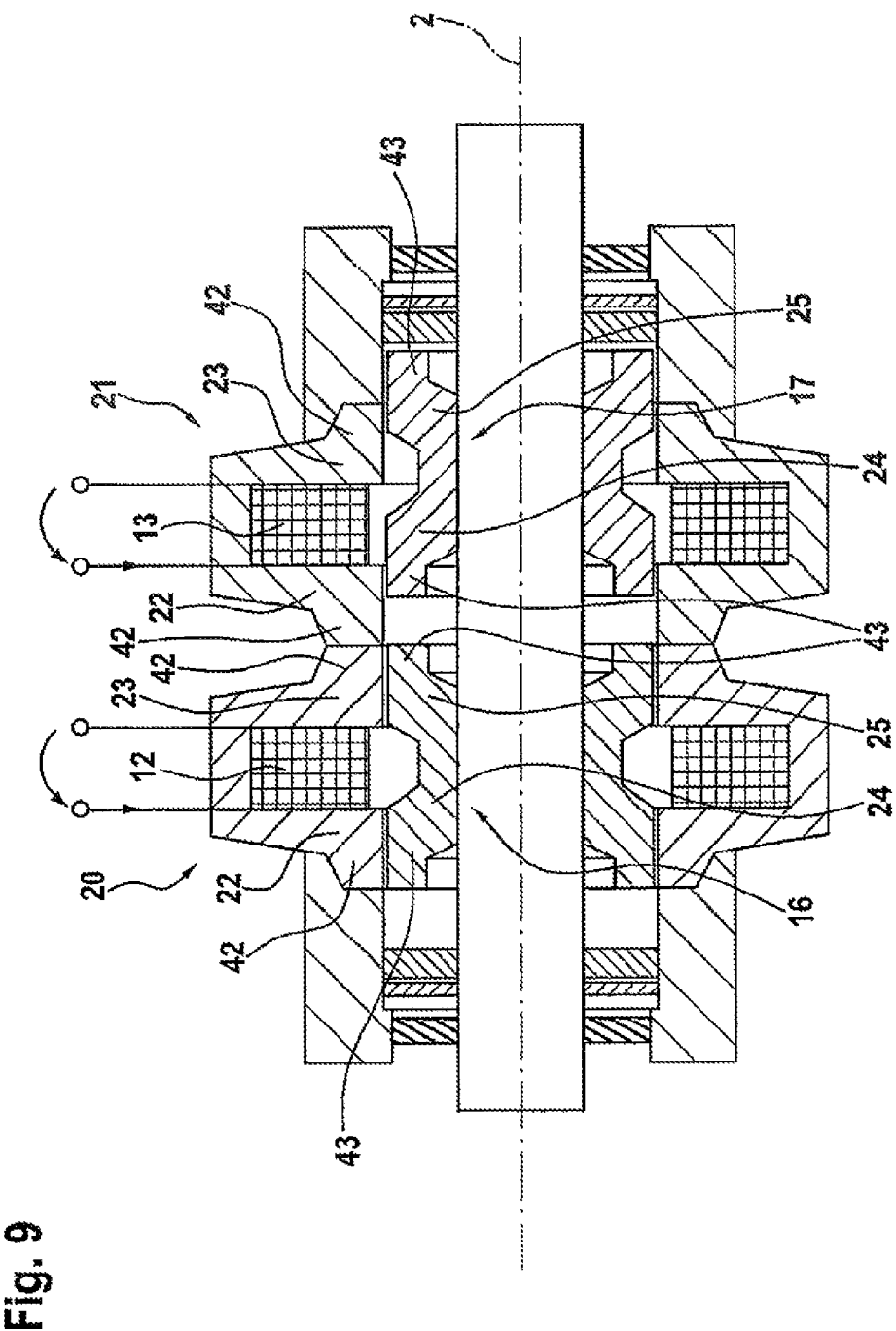
FIG. 9 is a schematic longitudinal sectional illustration through a further embodiment of the linear drive with a first form of a coil core and of an armature element.

FIG. 9 shows a longitudinal sectional illustration through the linear drive, wherein the coil cores 20 and 21 and the armature elements 16 and 17 are provided in a first form. It can be clearly seen that the coil cores 20 and 21 and the armature elements 16 and 17 are based on a U-shape, as described above, but supplement this with additional enhancements. Accordingly, thickened portions 42 are provided in each case on the free ends 22 and 23, which thickened portions extend in the axial direction away from the coil winding 12 or 13 respectively. The armature arms 24 and 25 also have thickened portions 43 of analogous design.

Figure 10:
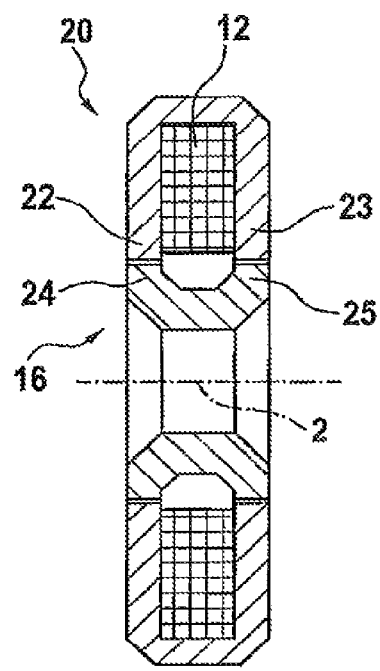
FIG. 10 is a longitudinal sectional illustration through a second form of the coil core and of the armature element.
Figure 11:
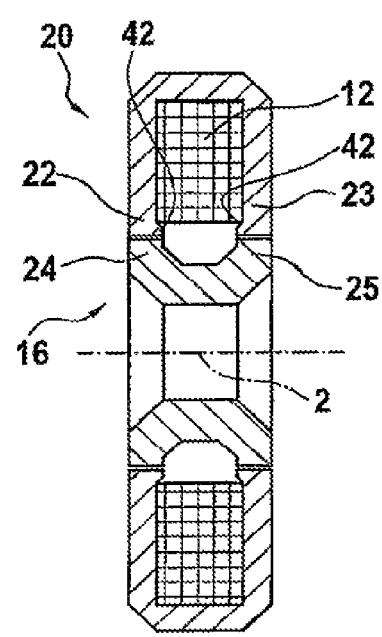
FIG. 11 is a longitudinal sectional illustration through a third form of the coil core and of the armature element.
Figure 12:
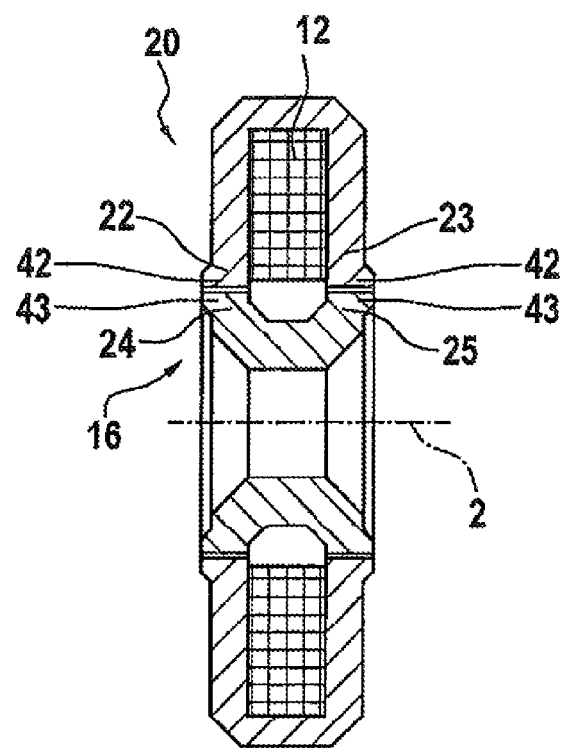
FIG. 12 is a longitudinal sectional illustration through a fourth embodiment of the coil core and of the armature element.

FIGS. 10 to 12 show further forms of the coil cores 20 and 21 and of the armature elements 16 and 17, wherein, by way of example, in each case only the armature element 16 and the coil core 20 will be discussed. For all exemplary embodiments, it can be seen that the free ends 22 and 23 have the same axial extent as the armature arms 24 and 25. More precisely, the free end 22, on its side facing toward the armature arm 24, has the same axial extent as the armature arm 24, and the free end 23, on its side facing toward the armature arm 25, has the same axial extent as the armature arm 25.

In the case of FIG. 10, no thickened portion is provided, and instead the free ends 22 and 23 have a uniform thickness as viewed in the axial direction. In the case of FIG. 11, the free ends 22 and 23 each have the thickened portion 42, the latter however pointing inward in the axial direction, that is to say in the direction of the coil winding 12. Consequently, retention of the coil winding 12 in the radial direction is realized by means of the thickened portions 42. FIG. 12 finally shows a further form of the coil core 20 and of the armature element 16, wherein here, both the free ends 22 and 23 have the thickened portion 42 and the armature arms 24 and 25 have the thickened portion 43. The thickened portions 42 and 43 each point outward in the axial direction, that is to say away from the coil winding 12.

The linear drive 1 described above may be used in particular for applications in which particularly quiet operation is required and in which, at the same time, the installation space availability is low. In particular, said linear drive can be used for driving the piston pump, for example if high pressures are required. A negative-pressure pump may also be driven by means of the linear drive 1. In particular, the linear drive 1, and/or the piston pump driven by it, is used in brake control systems, for example ABS, ESP and/or EHB brake control systems, in the field of fuel delivery, for example in the case of gasoline direct injection, in the field of tools, if the generation of high pressure is required, for example in the case of paint spraying units, and/or in the field of household appliances.

What is claimed is:
1. A linear drive, comprising:
a first electromagnetic drive device;
a second electromagnetic drive device; and
a drive piston including an armature carrier formed of a non-magnetic or magnetically passive material, the armature carrier having armature elements fastened thereto, the armature elements being spaced apart from each other along the armature carrier, the armature elements along with the drive piston and the armature carrier being configured to be moved in a first axial direction by the first drive device and a second axial direction by the second drive device,
wherein the first drive device and the second drive device are each in the form of a reluctance drive device, and
wherein each of the reluctance drive devices has (i) a stator with a coil winding, the coil winding engaging around the armature carrier of the drive piston in a circumferential direction, and (ii) a coil core which has a coil receptacle, open in a radial direction toward the armature carrier of the drive piston, for the coil winding,
wherein the coil core of each of the reluctance drive devices is assigned a respective one of the armature elements arranged on the armature carrier of the drive piston,
wherein each of the coil cores has two free ends, and
wherein each of the armature elements has two armature arms which, in the radial direction, face the two free ends of the respective coil core to which the armature element is assigned.

2. The linear drive according to claim 1, wherein the coil receptacle of the coil core of each of the reluctance drive devices is delimited in the axial direction by the two free ends of the respective coil core of the reluctance drive devices, which point in the radial direction toward the drive piston, of the coil core.

3. The linear drive according to claim 1, wherein the coil core of each of the reluctance drive devices has the same axial extent as the armature element assigned thereto.

4. The linear drive according to claim 1, wherein the two armature arms have the same dimensions in the axial direction as the two free ends of the coil core to which the armature element is assigned.

5. The linear drive according to claim 1, wherein the armature elements have a greater spacing from one another in the axial direction than the coil cores.

6. The linear drive according to claim 1, wherein the armature elements are arranged relative to one another such that, when one of the armature elements is in a position of congruence with respect to the corresponding coil core, the respective other armature element is displaced out of its position of congruence, the position of congruence being a position of minimum reluctance with respect to the corresponding coil core.

7. The linear drive according to claim 1, further comprising a restoring spring element operatively connected to the drive piston.

8. The linear drive according to claim 1, further comprising:
a piston pump that is actuated by the drive piston.

9. A piston pump arrangement, comprising:
a piston pump including a pump piston; and
a linear drive configured to actuate the pump piston, the linear drive including:
    a first electromagnetic drive device;
    a second electromagnetic drive device; and
    a drive piston including an armature carrier formed of a non-magnetic or magnetically passive material, the armature carrier having armature elements fastened thereto, the armature elements being spaced apart from each other along the armature carrier, the armature elements along with the drive piston and the armature carrier being configured to be moved in a first axial direction by the first drive device and a second axial direction by the second drive device,
wherein the first drive device and the second drive device are each in the form of a reluctance drive device, and
wherein each of the reluctance drive devices has (i) a stator with a coil winding, the coil winding engaging around the armature carrier of the drive piston in a circumferential direction, and (ii) a coil core which has a coil receptacle, open in a radial direction toward the armature carrier of the drive piston, for the coil winding,
wherein the coil core of each of the reluctance drive devices is assigned a respective one of the armature elements arranged on the armature carrier of the drive piston,
wherein each of the coil cores has two free ends, and
wherein each of the armature elements has two armature arms which, in the radial direction, face the two free ends of the respective coil core to which the armature element is assigned.

10. A linear drive, comprising:
a first electromagnetic drive device;
a second electromagnetic drive device; and
a drive piston configured to be moved in a first axial direction by the first drive device and a second axial direction by the second drive device,
wherein the first drive device and the second drive device are each in the form of a reluctance drive device, and
wherein each of the reluctance drive devices has (i) a stator with a coil winding, the coil winding engaging around the drive piston in a circumferential direction, and (ii) a coil core which has a coil receptacle, open in a radial direction toward the drive piston, for the coil winding,
wherein the coil core of each of the reluctance drive devices is assigned an armature element arranged on the drive piston,
wherein each of the coil cores has two free ends,
wherein each of the armature elements has two armature arms which, in the radial direction, face the two free ends of the respective coil core to which the armature element is assigned, and
wherein the coil core of each of the reluctance drive devices is formed of a plurality of core segments which are distributed uniformly about a circumference of the drive piston.

11. A linear drive, comprising:
a first electromagnetic drive device;
a second electromagnetic drive device; and
a drive piston configured to be moved in a first axial direction by the first drive device and a second axial direction by the second drive device,
wherein the first drive device and the second drive device are each in the form of a reluctance drive device, and
wherein each of the reluctance drive devices has (i) a stator with a coil winding, the coil winding engaging around the drive piston in a circumferential direction, and (ii) a coil core which has a coil receptacle, open in a radial direction toward the drive piston, for the coil winding,
wherein the coil core of each of the reluctance drive devices is assigned an armature element arranged on the drive piston,
wherein each of the coil cores has two free ends,
wherein each of the armature elements has two armature arms which, in the radial direction, face the two free ends of the respective coil core to which the armature element is assigned, and
wherein a total axial extent of the armature elements along the drive piston is greater than a total axial extent of the coil cores of the reluctance drive devices.

* * * * *